United States Patent Office 3,152,954
Patented Oct. 13, 1964

3,152,954
PROCESS OF PREPARING MITOMYCIN C
Donna Bernice Cosulich, Pearl River, James Burns Patrick, Suffern, and Richard Preston Williams, Tomkins Cove, N.Y., assignors to American Cyanamid Company, New York, N.Y., a corporation of Maine
No Drawing. Filed Feb. 6, 1962, Ser. No. 171,348
5 Claims. (Cl. 167—65)

This invention relates to an improved process for the production of mitomycin C.

Mitomycin C is becoming of considerable interest by reason of its good antibacterial spectrum and its promising properties in animals against neoplasms. Mitomycin C is described in Antibiotics and Chemotherapy, May 1958, pages 228 to 240.

The process of the present invention produces mitomycin C by a chemical process starting with mitomycin A. Mitomycin A is one of a group of novel antibiotics having significant antitumor activity described by Hata et al. in J. Antibiotics, Ser. A, IX, No. 4, 141 (July 1956). Mitomycin A has been found to be identical with a material termed "antibiotic $\beta$" and described in the application of Bohonos, Dann, Hausmann, Zbinovsky and Backus, Serial No. 840,001, filed September 15, 1959, now abandoned.

The reaction with mitomycin A is with ammonia preferably in the form of aqueous ammonium hydroxide and the reaction proceeds readily at room temperature.

The present invention will be described in greater detail in conjunction with the following specific example in which the parts are by weight unless otherwise specified.

Example

Ten parts of mitomycin A are dissolved in 10,000 parts of dilute ammonium hydroxide, (1 N) and the solution is stirred in a vessel protected from light. The mixture is then allowed to stand at room temperature until the reaction is complete. This normally takes from one to two hours, but will vary somewhat with the size of the batch. The reaction mixture is then frozen and dried in the frozen state, leaving the crude synthetic mitomycin C as a blue powder. The crude material is then recrystallized, for which purpose any one of three solvents, namely water, methanol or a mixture of dimethylformamide and water may be used. A first crop of about five parts of blue crystals are obtained and a further yield of crystals can then be obtained by concentrating the mother liquor to a small volume and cooling.

The synthetic mitomycin C is identical in all respects with natural mitomycin C prepared by fermentation and has the same antibiotic activity.

Since mitomycin C is capable of reacting with ammonia the reaction is preferably stopped at the point where the maximum of mitomycin C is produced.

This application is a continuation-in-part of our application Serial No. 49,164, filed August 12, 1960, now abandoned.

We claim:

1. A process of producing mitomycin C which comprises reacting mitomycin A with dilute ammonia solution at about room temperature for a period of time of from about 1 hour to about 2 hours, removing excess reaction medium at low temperatures, and recovering mitomycin C.

2. A process according to claim 1 in which the recovery of mitomycin C is effected by freeze-drying the reaction mixture.

3. A process according to claim 2 in which the mitomycin C produced is purified by recrystallization.

4. A process according to claim 1 in which the reaction of mitomycin A with dilute ammonia solution is effected in the substantial absence of actinic light.

5. A process according to claim 4 in which the mitomycin C is recovered from the reaction mixture by freeze drying.

References Cited in the file of this patent

J. Antibiotics, Ser. A No. 4 p. 141 (July 1956).
Antibiotics and Chemotherapy, May 1958, pp. 228–240.
Webb: Jour. Amer. Chem. Soc., 84 pages, 3185–3190 (August 20, 1962).